United States Patent
Talbot et al.

(10) Patent No.: US 8,359,201 B1
(45) Date of Patent: Jan. 22, 2013

(54) RANDOMIZED LANGUAGE MODELS

(75) Inventors: David Talbot, San Francisco, CA (US); Thorsten Brants, Palo Alto, CA (US)

(73) Assignee: Google, Inc., Mountain View, CA (US)

(*) Notice: Subject to any disclaimer, the term of this patent is extended or adjusted under 35 U.S.C. 154(b) by 0 days.

(21) Appl. No.: 13/488,914

(22) Filed: Jun. 5, 2012

Related U.S. Application Data

(63) Continuation of application No. 11/972,349, filed on Jan. 10, 2008, now Pat. No. 8,209,178.

(51) Int. Cl.
*G06F 17/27* (2006.01)
*G10L 15/00* (2006.01)
*G10L 15/28* (2006.01)

(52) U.S. Cl. ............. 704/255; 704/9; 704/254; 704/270

(58) Field of Classification Search .............. 704/9, 54, 704/255
See application file for complete search history.

(56) References Cited

U.S. PATENT DOCUMENTS

| | | |
|---|---|---|
| 6,856,956 B2 | 2/2005 | Thrasher et al. |
| 7,031,910 B2 | 4/2006 | Eisele |
| 7,231,349 B2 | 6/2007 | Li et al. |
| 7,877,258 B1 | 1/2011 | Chelba et al. |
| 2004/0243411 A1 | 12/2004 | Li et al. |

*Primary Examiner* — Justin Rider
(74) *Attorney, Agent, or Firm* — Harness, Dickey & Pierce, P.L.C.

(57) ABSTRACT

Systems, methods, and apparatuses including computer program products are provided for encoding and using a language model. In one implementation, a method is provided. The method includes generating a compact language model, including receiving a collection of n-grams, each n-gram having one or more associated parameter values, determining a fingerprint for each n-gram of the collection of n-grams, identifying locations in an array for each n-gram using a plurality of hash functions, and encoding the one or more parameter values associated with each n-gram in the identified array locations as a function of corresponding array values and the fingerprint for the n-gram.

25 Claims, 6 Drawing Sheets

RANDOMIZED LANGUAGE MODELS

CROSS-REFERENCE TO RELATED APPLICATIONS

This application is a continuation of U.S. patent application Ser. No. 11/972,349 filed on Jan. 10, 2008. The entire disclosure of the above application is incorporated herein by reference.

BACKGROUND

This specification relates to language models stored for digital language processing.

Language models are used to model a probability that a string of words in a given vocabulary will appear in a language. For example, language models are used in automatic speech recognition, machine translation, and optical character recognition applications. Modeling the probability for a string of words in the vocabulary is typically performed using a chain rule and calculating the probability of a given word, w, in a given string context, p(w|context), where the context is the words in the string preceding the given word, w.

In an n-gram language model, the words in the vocabulary are formed into n-grams. An n-gram is a sequence of n consecutive words. An n-gram has an order, which is the number of words in the n-gram. For example, a 1-gram (or unigram) includes one word; a 2-gram (or bi-gram) includes two words.

A given n-gram can be described according to different portions of the n-gram. An n-gram can be described as a context and a future word, (context, w), where the context has a length n−1 and w represents the future word. For example, the 3-gram "the black sheep" can be described in terms of an n-gram context and a future word. The n-gram context includes all words of the n-gram preceding the last word of the n-gram. In the given example, "the black" is the context. The left most word in the context is referred to as the left word. The future word is the last word of the n-gram, which in the example is "sheep". The n-gram can also be described with respect to a right context and a backed off context. The right context includes all words of the n-gram following the first word of the n-gram, represented as a (n−1)-gram. In the example above, "black sheep" is the right context. Additionally, the backed off context is the context of the n-gram less the left most word in the context. In the example above, "black" is the backed off context.

The probability according to the n-gram language model that a particular string will occur can be determined using the chain rule. The chain rule determines a probability of a string as a product of individual probabilities. Thus for a given string "$e_1, e_2, \ldots, e_k$", the probability for the string, $p(e_1, e_2, \ldots e_k)$, is equal to:

$$\prod_{i=1}^{k} p(e_i \mid e_1, \ldots, e_{i-1})$$

The n-gram language model can be limited to a particular maximum size n-gram, e.g., limited to 1-grams, 2-grams, 3-grams, etc. For example, for a given string "NASA officials say they hope," where the maximum n-gram order is limited to 3-grams, the probability for the string can be determined as a product of conditional probabilities as follows: p(NASA officials say they hope)=p(NASA)×p(officials|NASA)×p(say|NASA officials)×p(they|officials say)×p(hope|say they). This can be generalized to:

$$p(e_1, \ldots, e_k) = \prod_{i=1}^{k} p(e_i \mid e_{i-n+1}, \ldots, e_{i-1})$$

where n is the order of the largest n-gram allowed in the language model.

The conditional probabilities are generally determined empirically, according to relative frequencies in a corpus of text. For example, in the example above, the probability of the word "say" given the context of "NASA officials" is given by:

$$p(\text{say} \mid NASA \text{ officials}) = \frac{f(NASA \text{ officials say})}{f(NASA \text{ officials})},$$

where f (NASA officials say) is a frequency or a count of the occurrences of the string "NASA officials say" in the corpus. Conditional probabilities for strings within the maximum n-gram order in the n-gram language model correspond to the probability stored in the language model for the n-gram, e.g., p(say|NASA officials) is the conditional probability stored in the language model for the 3-gram entry "NASA officials say".

SUMMARY

Systems, methods, and apparatuses including computer program products are provided for encoding and using a language model. In general, in one aspect, a method is provided. The method includes generating a compact language model, including receiving a collection of n-grams, each n-gram having one or more associated parameter values, determining a fingerprint for each n-gram of the collection of n-grams, identifying locations in an array for each n-gram using a plurality of hash functions, and encoding the one or more parameter values associated with each n-gram in the identified array locations as a function of corresponding array values and the fingerprint for the n-gram.

Other embodiments of this aspect include systems, apparatuses, and computer program products.

Implementations of the aspect can include one or more of the following features. The aspect can further include using the language model to identify the one or more associated parameter values for a received n-gram. The one or more associated values include a probability of the n-gram occurring within a particular corpus of data.

Identifying locations in the array can further include building an array having a specified number of locations, identifying a plurality of locations corresponding to each n-gram in the collection, identifying a first n-gram-location pair corresponding to a first n-gram associated with a first location of degree one, where the first location is of degree one when no other n-gram of the collection of n-grams is associated with the first location, and removing the first n-gram-location pair such that the n-gram no longer corresponds to any other locations in the array such that one or more other locations in the array are of degree one.

The aspect can further include sequentially identifying additional locations of degree one and removing the corresponding n-gram-location pairs until each n-gram of the collection is matched with a unique location in the array. The aspect can further include assigning array values to the plurality of locations associated with the last n-gram of the collection paired with a unique location in the array. The plurality of locations associated with the last n-gram can be assigned values such that the combination of the assigned values and the fingerprint of the last n-gram provides the one or more associated parameter values for the last n-gram.

The aspect can further include assigning values to the unique location associated with each n-gram in a reverse order from the sequential order in which the n-gram-location pairs were identified, and where locations in the array having been associated with particular n-grams of the collection positioned earlier in the reverse order are unchanged. The aspect can further include selecting a plurality of hash functions to apply to each n-gram of the collection in order to identify locations in the array. The aspect can further include selecting different hash functions when each n-gram of the collection is not matched with a unique location in the array. The aspect can further include dividing the plurality of n-grams into a plurality of chunks and separately encoding the one or more parameter values associated with the n-grams of each chunk.

In general, in one aspect, a method is provided. The method includes receiving an n-gram and searching for one or more parameter values associated with the n-gram, including identifying a fingerprint corresponding to the received n-gram, performing a composite hash on the n-gram, identifying array locations corresponding to the composite hash values, and combining the values of the array locations with the fingerprint value to identify one or more n-gram parameter values.

Other embodiments of this aspect include systems, apparatuses, and computer program products.

Implementations of the aspect can include one or more of the following features. Identifying array locations can further include identifying a particular array of a plurality of arrays associated with the received n gram, where each array of the plurality of arrays includes a distinct group of n grams of a collection of n grams. The aspect can further include reducing an error rate including performing a search for a lesser included n-gram of the received n-gram and when one or more parameter values for lesser included n-gram is not identified, not searching for the received n-gram. The aspect can further include reducing an error rate including performing a search for an n–1-gram as a lesser included n-gram of the received n-gram and when one or more parameter values for the n–1-gram is not identified, truncating the search for the received n-gram to a lesser included n-gram.

Particular embodiments of the invention can be implemented to realize one or more of the following advantages. A language model can be encoded such that the language model has a small memory footprint. The storage size of the language model does not depend on the order of the encoded n-grams or the vocabulary size. The language model is encoded to provide efficient access to n-gram parameter values. The actual n-grams themselves do not need to be stored explicitly within the language model. Lookup of particular n-gram values is very efficient.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
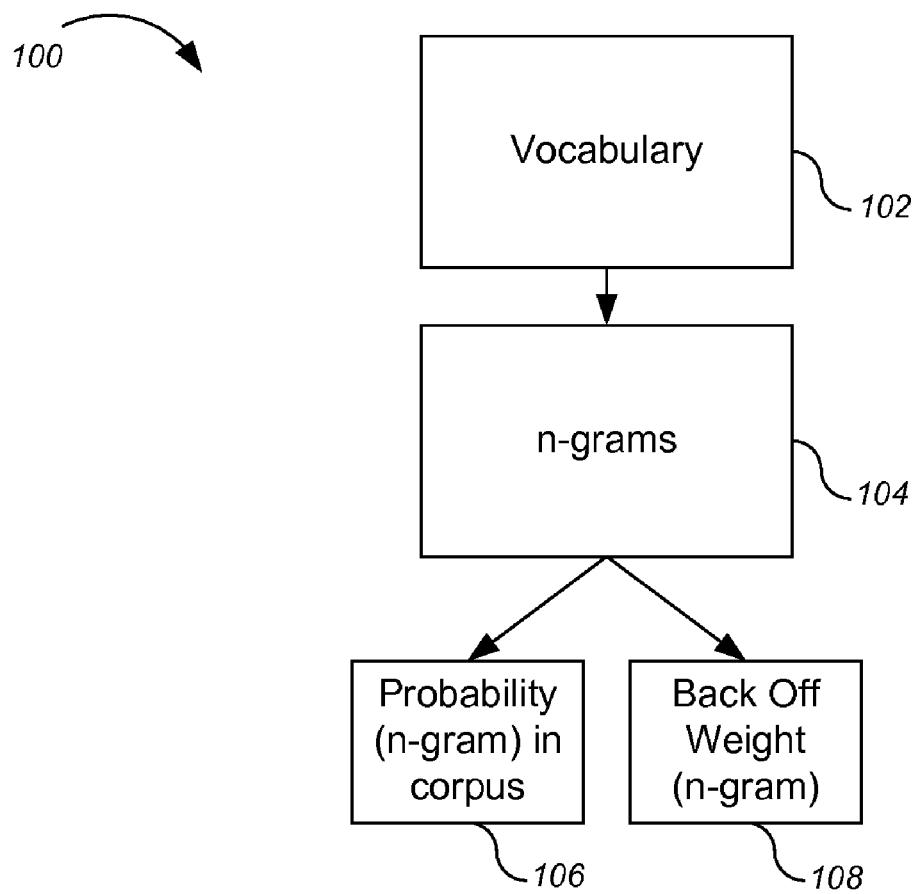
FIG. 1 is a block diagram illustrating components for building a language model.

FIG. 1 is a block diagram illustrating components for building a language model 100. The language model 100 includes a vocabulary 102 and a collection of n-grams 104. The vocabulary 102 is a collection of distinct words found in a corpus of text used to train the language model. The corpus can include a number of different sources of text, including, e.g., web pages and news articles. In some implementations, the corpus includes text on the order of tens to hundreds of billions of words, or even more. One such corpus is the Linguistic Data Consortium ("LDC") Web 1T 5-gram Version 1 corpus, LDC Catalog No.: DC2006T13, ISBN: 1-58563-397-6, contributed by Google Inc. In this corpus, the length of the n-grams ranges from unigrams (single words) to five-grams, and each n-gram has an n-gram count generated from approximately one trillion word tokens (including individual words, punctuation, markers identifying a beginning and end of individual sentences) of text from publicly accessible Web pages. In general, the corpus can be a single language or can include several languages, e.g., for machine translation applications, for which a language model can be built for each language. For example, a sample corpus could include texts of 200 billion English words, 88 billion Chinese words, and 30 billion German words.

The words in the vocabulary 102 are used to form n-grams 104. The n-grams can be stored, for example, in an n-gram table. The maximum order of the n-grams can be specified. For example, if the model has a maximum order of five, the collection of n-grams would include all occurring 1-grams, 2-grams, 3-grams, 4-grams, and 5-grams. The number of n-grams can be reduced by mapping rare words to a single "unknown word" placeholder, e.g., "<UNK>", in the n-grams. A rare word is one that occurs very infrequently in the corpus, for example, with a frequency of less than once per five billion words of text. Thus, some multiple n-gram entries can be reduced to a single n-gram entry. For example, the n-gram "word-A word-B RareWord1 word-C word-D" and the n-gram "word-A word-B RareWord2 word-C word-D" can both be mapped to the n-gram "word-A word-B <UNK> word-C word-D".

Each n-gram stored in the language model 100 has an associated probability 106. The probability 106 is the conditional probability of each n-gram according to a frequency in which the n-gram occurs in the corpus.

A back-off weight can optionally be determined for n-grams having an order less than the maximum order. For example, for an n-gram language model having a maximum order of three, back off weights can be determined for each 1-gram and 2-gram. The back-off weight ("BOW") is a factor applied to estimate the probability for an n-gram when it is not found in the collection of n-grams 106. For example, if a particular 3-gram (word 1, word 2, word 3) is not found in the collection of n-grams 106, the probability of the third word given the first and second word of the n-gram, p(word 3|word1 word 2) can still be determined. The probability can be determined as a function of the BOW and a probability for the third word of the n-gram given the second word, p(word 3|word 2), such that p(word 3|word 1 word 2)=BOW(word1 word2) p(word 3|word 2). The BOW can be determined, for example, according to the probability associated with the context of the given n-gram in the corpus in order to assess a likelihood that word 1 will be followed by word 2.

For example, if the n-gram "the black sheep" is not found in the language model, its probability can still be determined. The probability for the full n-gram "the black sheep" is equal to the probability of "sheep" given "black" (e.g., p(sheep|black), i.e., the probability of the n-gram "black sheep", multiplied by the BOW for the n-gram "the black"

In some implementations, the language model includes a table that includes n-grams and their respective probabilities and back-off weights, where applicable. The table can be used to identify the probability of a given string (e.g., one received to be tested against the language model) using the n-grams of the string. The string can include words, punctuation, and other text. Additionally, the string can include other information identifying a sentence beginning, a sentence end, and other information about the contents of the string. Additionally, using the back-off weights, the language model can be used to determine a probability for an n-gram that is not found in the corpus. This type of language model can be referred to as a back-off n-gram language model.

The language model for a corpus can be very large. In some implementations, the language model is built using distributed processing. For example, when building the language model, the raw data of the corpus can be separated into a number of different parts by sharding the corpus. Sharding refers to the process of separating a large data set into smaller pieces. A sharding function applies a unique shard identifier to chunks of data in the corpus, splitting the large data set into a number of disjoint subsets. There can be redundancy in the data contained within shards, for example, for efficiency or to protect against hardware failures for a particular shard.

The data forming the language model can be distributed, for example, according to the Google™ File System (GFS). The GFS architecture includes a GFS cluster having a single master and multiple "chunkservers". Files are divided into fixed size chunks, which are uniquely identified by the master and stored on a particular chunkserver. Each chunk can be replicated on multiple chunkservers. The master includes file system metadata. This includes namespace, access control information, mapping from files to chunks, and locations of chunks. Additional information about GFS can be found in Ghemawat et al., "The Google File System", Symposium on Operating System Principles, Oct. 19-20, 2003.

In some implementations, the data contained in each shard is processed in parallel to identify words including sentence beginning ("<s>") and end ("</s>") marker. The processed information can be used when generating the vocabulary for the language model, which includes sentence markers as words, as will be described below. For example, a MapReduce process can be undertaken to process the data.

The term MapReduce describes both a programming model and an implementation of the model for processing and generating large data sets. The model and its library implementation will both be referred to as MapReduce. Using MapReduce, programmers specify a map function that processes input (key, value) pairs to generate a set of intermediate (key, value) pairs, and a reduce function that merges all intermediate values associated with the same intermediate key. Programs written in this functional style can automatically be parallelized and executed on a large cluster of commodity computers. The runtime system or framework can be implemented to partition the input data, schedule the program's execution across a set of machines, handle machine failures, and manage the required inter-machine communication.

Additional details of MapReduce are described in J. Dean and S. Ghemawat, *MapReduce: Simplified Data Processing on Large Clusters*, Proceedings of the 6th Symposium on Operating Systems Design and Implementation, pp. 137 150 (Dec. 6, 2004), the contents of which are incorporated here by reference.

To summarize, a language model can be generated from a corpus in the following steps. The system generates a vocabulary. Using input text from the corpus, the system outputs a vocabulary of 1-grams and their frequencies. Next, n-grams and their frequencies are identified. The n-grams and their frequencies are identified using the text and vocabulary as input. Relative frequencies for the n-grams are calculated using the n-grams and their respective frequencies. Each step in the process can be implemented using MapReduce as described above.

Figure 2:
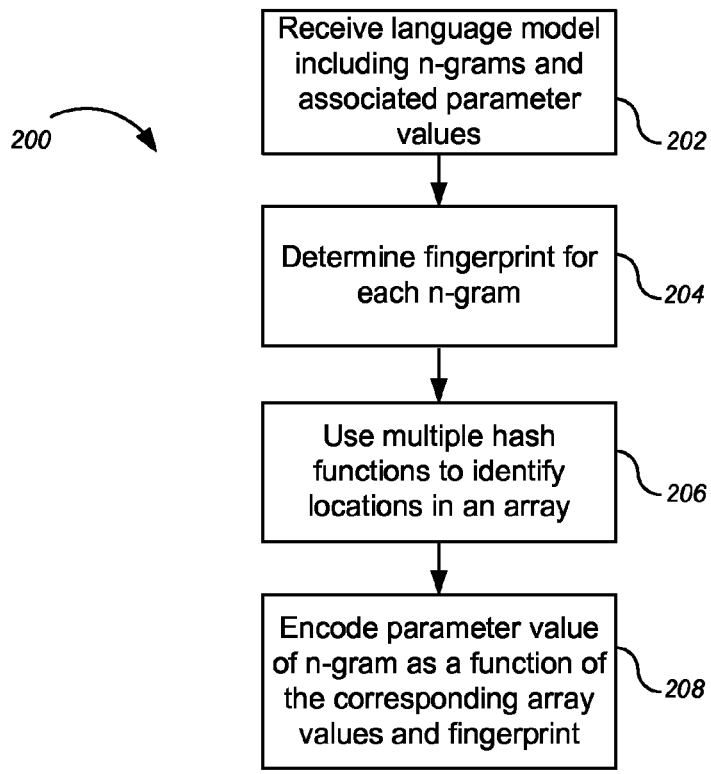
FIG. 2 is a flow chart of an example method for encoding a language model.

FIG. 2 is a flow chart of an example method 200 for encoding a language model. For convenience, the method 200 will be described with respect to a system that performs the method 200.

The system receives 202 a language model. The language model includes a collection of n-grams and one or more associated parameter values. The parameter values can be, for example, probability values for each n-gram indicating the probability of the n-gram occurring in a particular corpus. Additionally, the parameter values can include back-off weights for each back-off n-gram, the n-grams' frequencies, or other values associated with the n-grams.

In some implementations, the language model is constructed by the system, for example, as described in FIG. 1. Alternatively, in some other implementations, the language model data is received. For example, the system can receive a previously constructed (e.g., by the system or from a separate system including third party systems) collection of n-grams and associated parameter values.

In some implementations, the language model is encoded using a Bloomier filter such that parameter values for each n-gram in the language model can be retrieved using an associative array of values. A Bloomier filter is a generalized form of a Bloom filter. A Bloom filter is a succinct approximate membership tester that uses an array and hash functions to approximately represent a set.

In some implementations, the system uses randomization to map each n-gram to a distinct fingerprint and to generate hash functions to associate each n-gram with their corresponding parameter values. The system encodes the language model including a set of n-grams/parameter value pairs using an array A having a size M. The set of n-grams/parameter value pairs can be represented as:

$$S=\{(x_1,v(x_1),(x_2,v(x_2)),\ldots,(x_N,v(x_N))\}$$

Each n-gram $x_i$ is a member of the collection of all possible n-grams, U, and their associated parameter values $v(x_i)$ can be drawn from a corresponding set of possible values, V.

The system determines 204 a fingerprint value for each n-gram in the collection of n-grams S. Note the distinction between all possible n-grams U over which the hash/fingerprint functions are defined and the set of actual n-grams S that are stored in the model. Using a fingerprint function, a corresponding fingerprint value can be stored for each n-gram such that the n-grams themselves no longer need to be explicitly stored in the language model. The system determines the fingerprint for each n-gram using a particular fingerprint function. For example, a fingerprint function f: U→[0, B−1] provides a random hash function that maps n-grams to integers having values between 0 and B−1. The value of B is at least as large as the range of values stored, i.e., B is greater than or equal to the size of V. A hash function is a function that when applied to an input (e.g., an n-gram) produces a particular output value (e.g., a number). Thus, application of a hash function to each element of a collection of n-grams produces a corresponding fingerprint value for each n-gram.

In some implementations, the array A has a number of locations (addresses) of size $\log_2 B$. As a result, the size of B impacts the amount so space used per encoded n-gram. While a larger B can be used to lower the probability of a false positive result (e.g., the error rate identifying the probability that two different n-grams incorrectly correspond to the same parameter values in the array), the larger B also increases the size of the encoded language model. Therefore, a balance is needed between the size of the language model and an acceptable error rate.

The system uses 206 multiple hash functions to identify locations in the array corresponding to each n-gram. In some implementations, three hash functions are used. In some implementations, the hash functions are used to construct a perfect hash function. A perfect hash function is a hash function for a set of data that maps different keys (data elements) in the set to different numbers. A perfect hash function produces output values in a range of size according to a constant multiplied by the number of elements in the set. The perfect hash function can be used for efficient lookup operations, for example, by associating the keys (e.g., n-grams) with locations in an array according to the values produced by the perfect hash function such that the keys themselves are no longer necessary.

In particular, the system uses k independent hash functions $h_1, h_2, \ldots, h_k$ where each hash function $h_i$: U→[0, M−1] maps each n-gram to a location in the array A, which has M cells numbered from 0 to M−1. The composite perfect hash function $g(x_i)$ is defined as:

$$g(x_i) = f(x_i) \otimes \left( \overset{k}{\underset{i=1}{\otimes}} A[h_i(x_i)] \right).$$

Where $f(x_i)$ is the fingerprint of n-gram $x_i$, $A[h_i(x_i)]$ is the value stored in location $h_i(x_i)$ of the array A corresponding to the hash $h_i$ applied to the n-gram $x_i$ for all k hash functions, and $\otimes$ is the bitwise exclusive OR operator. Additionally, to encode the one or more parameter values $v(x_i)$ for a particular n-gram using the array, the array values are chosen such that the value of $g(x_i)=v(x_i)$. The system encodes 208 one or more parameter values of the n-grams as a function of the corresponding array values and fingerprint.

Figure 3:
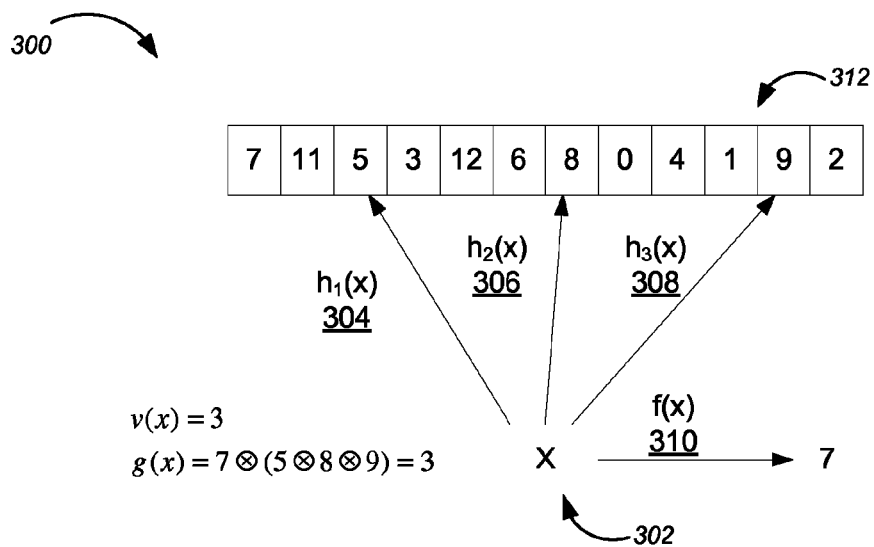
FIG. 3 is an example diagram of using a composite hash function to identify a parameter value for an n-gram

FIG. 3 is an example diagram 300 of using a composite hash function to identify a parameter value for an n-gram X 302. The n-gram X 302 has an associated parameter value of 3. The n-gram 302 is shown operated on by each of three hash functions, $h_1(x)$ 304, $h_2(x)$ 306, and $h_3(x)$ 308 as well as the fingerprint function f(x) 310. The fingerprint function f(x) 312, when applied to the n-gram, produces a value of 7. Each of the three hash functions 304, 306, and 308, when applied to X, point to particular locations in the array 312. In particular, hash function $h_1(x)$ 304 points to a location in the array 312 having a value of 5. Hash function $h_2(x)$ 306 points to a location in the array 312 having a value of 8. Hash function $h_3(x)$ 308 points to a location in the array 312 having a value of 9. The parameter value associated with n-gram X 302 can be determined using the above composite perfect hash function equation such that:

$$v(X)=g(X)=7 \otimes (5 \otimes 8 \otimes 9)=3.$$

Thus, the values of each location in the array are selected such that the composite perfect hash function returns the value of the corresponding n-gram. To do so, the values are assigned to locations in the array such that each n-gram $x_i$ is associated with a single updatable location in the array. The updatable location for each n-gram is selected from among the k locations given by $h_j(x_i)$, $j\in[k]$, where k is the number of hash functions and $h_j(x_i)$ is a particular hash function applied to the n-gram $x_i$.

The composite function $g(x_i)$ depends on the values stored at all k locations, $A[h_1(x_i)], A[h_2(x_i)], \ldots, A[h_k(x_i)]$, in the array (i.e., the values stored at each location identified by the k applied hash functions). Therefore, once a location is assigned a value for encoding an n-gram $x_i$, the value at that location should not be changed by the encoding of values for other n-grams. Similarly, in some implementations, the locations in A referenced by the other $h_j(x_i)$ for a given n-gram $x_i$ remains unchanged once the n-gram $x_i$ has been encoded in the model.

As a result, an order is chosen for entering n-grams into the array. For each n-gram a particular hash function of the k hash functions, $h_j$, is selected to map the n-gram to the unique location in A. Using the ordering of n-grams and the particular hash function $h_j$ for each n-gram in the collection, each n-gram can be encoded in the array such that the composite hash function returns the parameter value for the corresponding n-gram according to an update rule described by:

$$A[h_j(x_i)] = v(x_i) \otimes f(x_i) \otimes \left( \overset{k}{\underset{i=1 \cap i \neq j}{\otimes}} A[h_i(x_i)] \right).$$

Where $v(x_i)$ is the value of n-gram $x_i$, $f(x_i)$ is the fingerprint of n-gram $x_i$, and $$\left( \overset{k}{\underset{i=1 \cap i \neq j}{\otimes}} A[h_i(x_i)] \right)$$

is the bitwise exclusive OR of the values stored in the locations in the array A indexed by the k−1 hash functions excluding $h_j$ for the n-gram $x_i$ (i.e., the locations other than the location $h_j(x_i)$ that will be updated for this n-gram).

Figure 4:
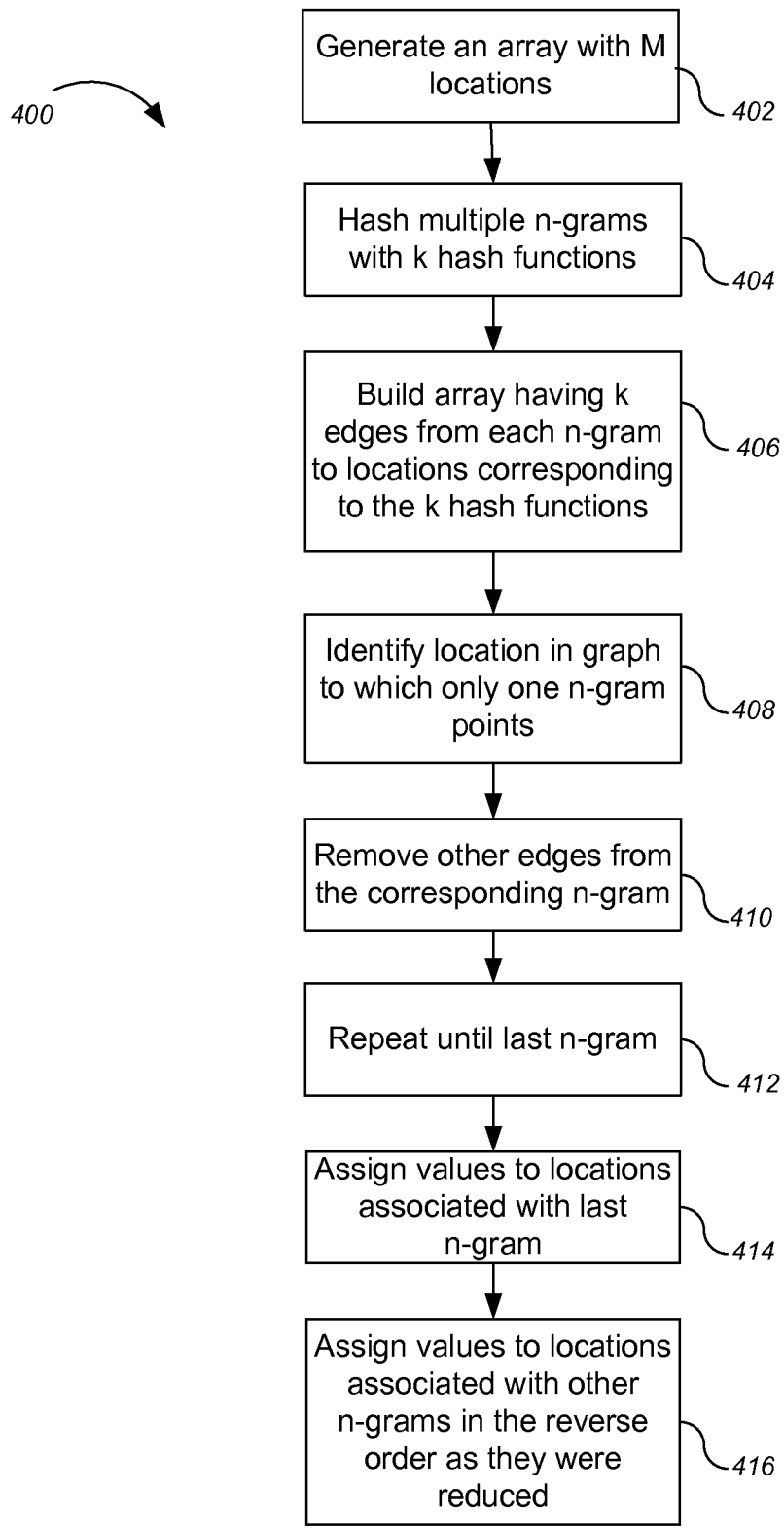
FIG. 4 is a flow chart of an example method 400 for encoding values in an array.

FIG. 4 is a flow chart of an example method 400 for encoding values in an array. For convenience, the method 400 will be described with respect to a system that performs the method 400. The method 400 is used to select one of the k hash functions, $h_j$, $j\in[k]$, for each n-gram $x_i\in S$, where S is the collection of n-grams to be encoded. The method 400 also determines an order in which to apply the update rule above so that $g(x_i)$ maps $x_i$ to $v(x_i)$ for all n-grams in S.

The system generates 402 an array having size M (e.g., having M address locations). In some implementations, each location is initially assigned a value of zero, or alternatively is empty. In order to ensure that the value for each n-gram is equal to the value of the composite perfect hash function, a single location is uniquely updated for each encoded n-gram. Thus, the system has to identify the location in the array unique to a particular n-gram such that other n-gram encodings do not change the value stored at that location.

The system hashes 404 each n-gram in a collection of n-grams with k different hash functions. In some implementations, three hash functions are used. However, any number of hash functions can be used. The system associates 406 each n-gram with k locations in the array corresponding to the k hash functions. For example, if three hash functions are used, each n-gram is associated with three locations in the array corresponding to the values produced by the respective hash functions (i.e., the value produced by the hash function when applied to a particular n-gram identifies a particular location in the array). Thus, the k hash functions are selected such that their output values are within the range of the array.

More generally, the n-grams of the collection and the locations in the array can be used to form a bipartite graph whose left hand side nodes correspond to n-grams and whose right hand side nodes correspond to locations in the array. Initially, the graph includes edges from each n-gram to each of the k locations in the array given by hash functions $h_1(x_i)$, $h_2(x_i)$, ..., $h_k(x_i)$. Thus, for example, if k=3, there are three hash functions applied to each n-gram, resulting in three edges from each n-gram pointing to three locations in the array. In some implementations, by chance, it is possible for two or more hash functions to point to the same location for a given n-gram $x_i$.

Figure 5:
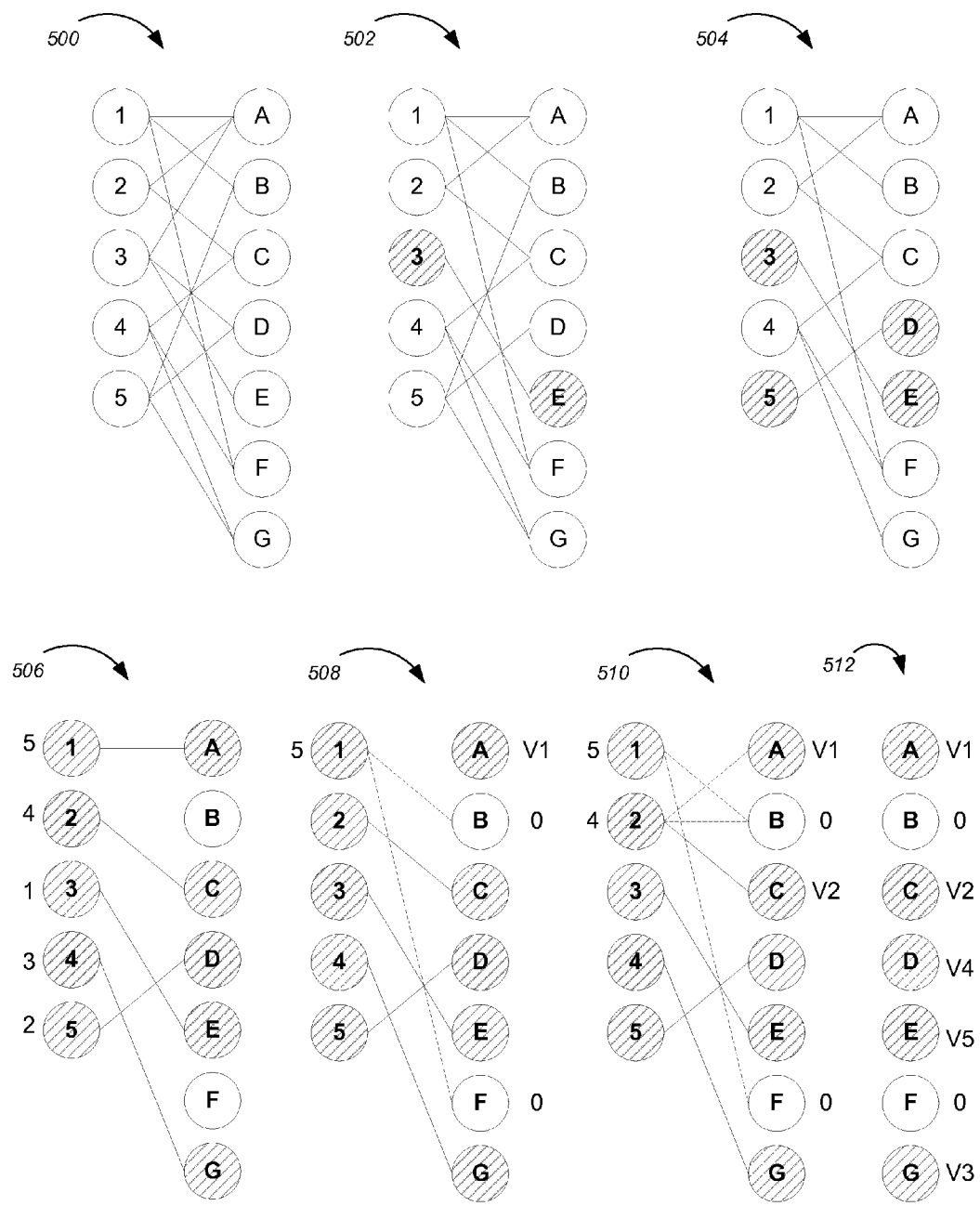
FIG. 5 shows a sequence of diagrams illustrating the relationship between n-gram keys and array locations for an example collection of n-grams and array locations.

FIG. 5 shows a sequence of diagrams 500-512 illustrating the relationship between n-gram keys and array locations for an example collection of n-grams and array locations. Diagram 500 shows a collection of five n-grams (1-5) and seven array locations (A-G). Each n-gram has three edges directed to three array locations. The edges represent the hash functions applied to the n-gram, where the result of each hash function identifies a respective array location. For example, the hash functions applied to n-gram 1 points to locations A, B, and F in the array.

As shown in FIG. 4, the system identifies 408 a first location in the array for which only one n-gram points. While each n-gram includes k edges from the n-gram to locations in the array, not all array locations are identified more than once. Additionally, some array locations may not be identified by any n-gram. A location in the array with only one edge can be referred to as a location that has degree one. In a bipartite graph, when a right hand side node has a degree of one, it can be matched with its associated left hand side node since no other left hand side node can be dependent on it. Thus, the location in the array with only one edge can be matched with a particular n-gram.

In some implementations, if no locations are pointed to by a single n-gram, one or more new hash functions are selected and the n-grams are rehashed. One method for selecting hash functions is to use 2-universal hash functions defined for a range of size M (i.e., for the size of the array) using a prime $P \geq M$ and two random numbers $1 \leq a_j \leq P$ and $0 \leq b_j \leq P$ for $j \in [k]$ such that $h_j(x) \equiv (a_j x + b_j) \bmod P$ taken modulo M. Hash functions are generated by sampling k pairs of random numbers $(a_j, b_j)$, $j \in [k]$. If the ordering technique does not match all the n-grams to locations using the generated hash function, the pairs of random numbers are resampled to provide new hash functions.

As shown in FIG. 5, diagram 500 includes an array location E that is only identified by n-gram 3. Every other location in the array is pointed to by more than one n-gram. Therefore, the first identified location is location E (the first location in the array having degree one).

The system removes 410 each other edge from the n-gram corresponding to the identified first location. Thus, the n-gram 3 is left with a single edge corresponding to the first location E. As shown in FIG. 5, diagram 502 shows n-gram 3 with only an edge pointing to location E. Thus, the edges from n-gram 3 to locations A and D are removed. Once identified as a location of degree one, the location and corresponding n-gram node can be removed from the graph and pushed onto a matched stack of n-gram/location pairs, $(x_i, h_j(x_i))$. Removing the locations from the graph after they are matched with a unique n-gram can be used to guarantee that each n-gram $x_i$ is assigned a unique location in the array.

The system repeats 412 the process of removing remaining edges from n-grams including an edge corresponding to a location of degree one in the array until each n-gram has been associated with a single location in the array. Once the edges are removed, additional locations in the array can become degree one. Thus, each location of degree one is sequentially identified, pairing each location with a unique n-gram to which the location is connected. The pairs are moved, in order, onto the matched stack.

For example, as shown in diagram 502 of FIG. 5, with the edges removed from n-gram 3 pointing to locations A and D, location D then only is pointed to by a single n-gram, n-gram 5. The remaining edges of n-gram 5, pointing to locations B and G, can then be removed. This can again open up additional locations in the array as having degree one. Diagram 506 of FIG. 5 shows the five n-grams each including an edge pointing to a unique location in the array. Since the array has more locations than there are n-grams, there are empty locations B and F that are not identified by any n-gram after the other edges are eliminated. Additionally, diagram 506 indicates the order in which the n-grams were associated with a single location in the array.

Once the unique location is identified for each n-gram, the locations can be encoded with location values. The system initially assigns 414 location values to locations associated with the last n-gram to have edges removed. The process is repeated 416 for locations associated with each n-gram in the reverse order to which edges were removed. The order in which the n-grams were pushed onto the stack of matched pairs determines the encoding order (i.e., n-grams are taken from the stack in the reverse order to which they were inserted).

For each n-gram, the edges are restored (e.g., all the locations for which the hash functions of the n-gram point) and the system identifies the unique location in the array that was paired with the n-gram during the matching process described above. This is the unique location that will be updated such that the composite hash function returns the one or more correct parameter values of the n-gram.

An example of assigning location values is shown in diagrams 508, 510, and 512 of FIG. 5. In diagram 508, the values of locations associated with n-gram 1 are encoded since n-gram 1 was the last n-gram to be associated with a single location in the array (location A). The other locations pointed to by n-gram 1 (e.g., using the other hash functions) are shown with dotted lines to locations B and F. Locations B and F are not uniquely associated with any of the n-grams. In some implementations, those locations are assigned a value of zero. Alternatively, those locations are already assigned a value of zero by default when the array is generated. In some other implementations, any constant or otherwise chosen value can be assigned to those locations. Those locations are not subsequently changed for the encoding of n-gram 1 to remain valid.

Consequently, a value for location A, V1, is determined and encoded. The location value for location A is determined such that the composite hash function returns a value corresponding to the one or more parameter values for n-gram 1. Since the values for the fingerprint of n-gram 1 as well as the values for locations B and F are constants, an appropriate value V1 for location A can be determined. Once encoded, the value for location A is unchanged (along with the values for locations B and F). As values for other n-grams are encoded, only the location value of the uniquely associated location is modified.

In diagram 510, the values of locations associated with n-gram 2 are encoded since n-gram 2 was the next to last n-gram to be associated with a single location in the array (location C). The three hash functions of n-gram 2 point to locations A, B, and C. The location values for locations A and B have already been assigned and are not changed. However, the location value for location value for location C, the location uniquely associated with n-gram 2, can be assigned. Thus, a location value V2 is determined such that the composite hash function returns a value corresponding to the one or more parameter values of n-gram 2.

The process is repeated for each n-gram in the reverse order in which the n-gram was uniquely associated with a particular location in the array. Since the n-grams are encoded in the reverse order from which they were matched to locations, the other n-grams that initially included edges to the location are necessarily on the matched stack, and therefore are only encoded after the n-gram is encoded at the location. As a result, dependencies in g are respected and $g(x_i)=v(x_i)$ will remain true as the values are encoded in the array for each n-gram in the collection.

In diagram 512, the final encoding is illustrated for all of the locations in the array. As a result, for any n-gram 1-5, the fingerprint value and array values corresponding to the hash functions applied to the n-gram provide a result corresponding to the one or more parameter values encoded for that n-gram (e.g., the probability of the n-gram occurring in a corpus).

An example algorithm for generating the ordered matching of n-grams and locations is set forth below:

```
Input : Set of n-grams S; k hash functions h_j, j ∈ [k]; number of available
locations M.
Output: Ordered matching 'matched' or FAIL.
matched⇐ [ ]
for all i ∈ [M] do
    r2l_i⇐ empty set
end for
for all x_i ∈ S do
    l2r_i⇐ empty set
    for all j ∈ [k] do
        l2r_i=l2r_i∪h_j(x_i)
        r2l_{h_j(x_i)}⇐r2l_{h_j(x_i)}+1
    end for
end for
degree_one⇐ {i ∈ [0,M−1]| |r2l_i |=1}
while |degree_one| ≧ 1 do
    rhs⇐POP degree_one
    lhs⇐POP r2l_{rhs}
    PUSH (lhs, rhs) onto matched
    for all rhs' ∈ l2r_{lhs} do
        POP r2l_{rhs'}
        if |r2l_{rhs'}| = 1 then
            degree_one⇐degree_one ∪ rhs'
        end if
    end for
end while
if |matched| = |S| then
    return matched
else
    return FAIL
end if
```

In some implementations, the array is separated into a plurality of array chunks to aid in encoding and searching the array. In particular, to encode a large set of n-gram/parameter value pairs, the raw data and the graph are held in memory as the hash functions are applied. However, this makes it difficult to encode a very large collection of n-gram/parameter value pairs in a single array. Determining unique locations in which to encode each n-gram can become cumbersome if the set of n-grams and/or the array are large. In some implementations, the n-gram/parameter value pairs are split into smaller chunks that are arranged in lexicographic order by n-gram. As an example, one or more of the smaller chunks can each encode five million n-grams.

The one or more parameter values for the n-grams in each chunk can then be encoded in a separate array in turn while being held in memory. An index can be sorted that includes the final n-gram encoded in each array. When searching for the one or more parameter values encoded for a particular n-gram, the system performs a binary search for the appropriate array using the index. Alternatively, the system can use one or more other searching techniques to identify the appropriate array. Once the array is located, the particular values of locations in the array can be retrieved.

Figure 6:
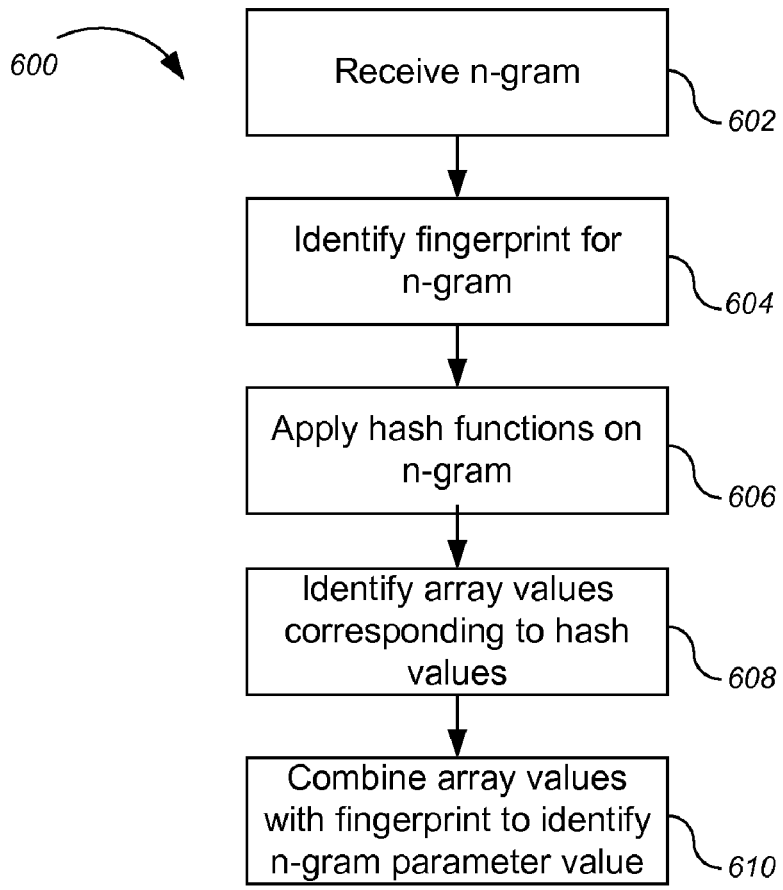
FIG. 6 is a flow chart of an example method for retrieving a parameter value for an n-gram.

FIG. 6 is a flow chart of an example method 600 for retrieving a parameter value for an n-gram. For convenience, the method 600 will be described with respect to a system that performs the method 600 (e.g., a speech recognition, machine translation, or optical character recognition system).

The system receives 602 an n-gram. For example, the n-gram can be received as part of a string (e.g., of text) including one or more n-grams. The string of text can be, for example, a string of text generated from an optical character recognition, voice recognition, or machine translation operation. The string can include text forming words, punctuation symbols, and other characters. Additionally, the string can include information for identifying a beginning of a sentence, an end of a sentence, or other formatting information about the content of the string.

The system identifies 604 a fingerprint for the n-gram. The fingerprint of the n-gram is identified by applying the fingerprint function $f(x_i)$ to the n-gram. The fingerprint function can apply a particular hash function to the n-gram such that a particular fingerprint value is generated.

The system applies 606 one or more hash functions to the n-gram (e.g., three hash functions). In some implementations, the hash functions together create a perfect hash function for S. Each hash function, when applied to the n-gram, provides a value identifying a particular location in the array (or a particular array when multiple arrays are used).

The system identifies 608 the values encoded in the array at the locations identified by the applied hash functions. In some implementations, the multiple arrays are used and a search is performed to identify the correct array for each identified location. For example, a binary search can be performed to identify the correct array. The value associated with each array location is retrieved.

The system combines 610 the array values with the fingerprint to identify the one or more parameter values for the received n-gram. In some implementations, the array values and fingerprint value are combined using an exclusive bitwise OR operation. The identified parameter values can include, for example, a probability of the n-gram occurring within a corpus of text. In some implementations, if the received n-gram does not have valid array values, then a NULL result is returned because the n-gram is not included in the language model.

The values encoded at each location in the array have a specified size. The size allotted to each location for encoding the values is selected to provide a balance between the size required to store the one or more parameter values and the acceptable error rate $\epsilon$ (i.e., the rate of having a false positive result whereby an n-gram not included in the model is assigned a value that is not NULL). In some implementations, the size allotted for each location is two bytes. The one or more parameter values can be stored in the first byte while the second byte can be used for error checking.

Figure 7:
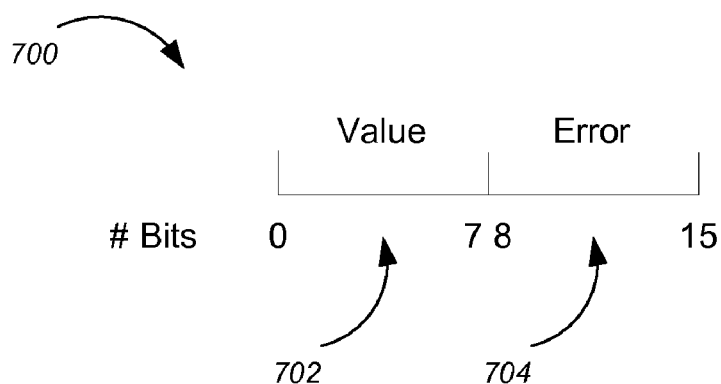
FIG. 7 is an example diagram of a two byte encoding.

FIG. 7 is an example diagram of a two byte encoding 700. The first byte 702 including bits 0-7 is used to encode the one or more parameter values associated with the particular n-gram. The second byte 704 including bits 8-15 is used for error checking. Using a full byte for error checking results in an error rate $\epsilon$ of $1/256$. By encoding all parameter values in the first byte, false positive results can be reduced. For example, if the composite hash function is applied to an unknown n-gram (e.g., an n-gram that is not found in the collection of n-grams S), the result can correspond to a value that is non-zero in the second byte. However, since the array was constructed such that all n-grams in the collection have values encoded in the first byte and that for these n-grams the second byte is guaranteed to be zero, it is known that the result is invalid (i.e., that the received n-gram is not in the collection and therefore there is no valid encoded parameter values to return for the input n-gram).

In some implementations, it is not necessary to explicitly dedicate particular bits to the value and the error checking. Instead, all values in a particular range are considered valid, all other values are invalid. For example, if there are 10 possible values (0, . . . , 9) then any number returned greater than 9 is assigned a NULL value. This results in an error rate of 10/256=0.039 when using 8 bits in total. By comparison, when using dedicated sections instead 4 bits are used to represent the 10 values and therefore 4 bits remain for error checking, which results in an error rate of $1/16$=0.0625. This fine-tuned error checking method can provide a bettor error rate when the range of values is not a power of 2.

Alternatively, in some implementations, valid values (e.g., values corresponding to a particular n-gram of the collection of n-grams) do not occupy contiguous ranges of values but are identified as an arbitrary subset of all values in the range [0, B−1]. Alternatively, in some implementations, an arbitrary subset of values in the range [0, B−1] are used to represent valid values (e.g., values corresponding to a particular n-gram in the collection) indirectly using a particular mapping. The mapping from integers in the range [0, B−1] to values can be implemented, for example, using a lookup table or a function of the integers between [0, B−1] where values in that range that do not correspond to valid values are mapped to a NULL symbol.

In some implementations, using a back-off smoothing technique, e.g., as discussed above in FIG. 1, an n-gram search typically first searches for the full n-gram first and then for shorter included n-grams only if the full n-gram is not found. However, if a received n-gram is a 5-gram ($w_1$, $w_2$, $w_3$, $w_4$, $w_5$) when only the final unigram ($w_5$) is encoded in the model, the probability of returning a false positive using the standard back-off process would not be the error rate $\epsilon$ (e.g., $1/256$), but instead would be compounded for each back-off n-gram prior to backing off to the unigram. This results in an error rate of approximately $4\epsilon$. For example, for an error rate $\epsilon$ of $1/256$, the actual resulting error would be approximately $1/64$, resulting in more false positive results during back-off operations.

The collection of n-grams, S, in the model is consistent such that:

$$(w_1, w_2, \ldots, w_n) \Rightarrow (w_2, \ldots, w_n) \in S.$$

Thus, an n-gram is not present in the model if the n−1-gram including the final n−1 words has already tested false (e.g., the lesser n-gram is not in the collection). Thus, unnecessary false positives can be avoided by not searching for the longer n-gram in such cases. Therefore, the system first searches for the unigram working up to the full n-gram requested only if the preceding searches test positive. As a result, the probability of returning a false positive for any n-gram requested, but not in the collection, returns to $\epsilon$.

Additional techniques can be used to reduce the error rate. For example, for an n-gram ABCDE the system can first check for the n−1-gram (ABCD). If this n-gram has be previously searched for but backed off to a lesser n-gram (e.g., CD), then the search can be initially truncated to CDE instead of ABCDE since we know that ABCD does not exist.

In another example, for the n-gram ABCDE the system can check for the n−1-gram BCDE identifying the suffix of the n-gram. If n-gram BCDE has been previously searched for, but only backed off result was found (e.g., DE), then the backed off value is returned and no further search is performed since the full n-gram can not be found in the collection.

Figure 8:
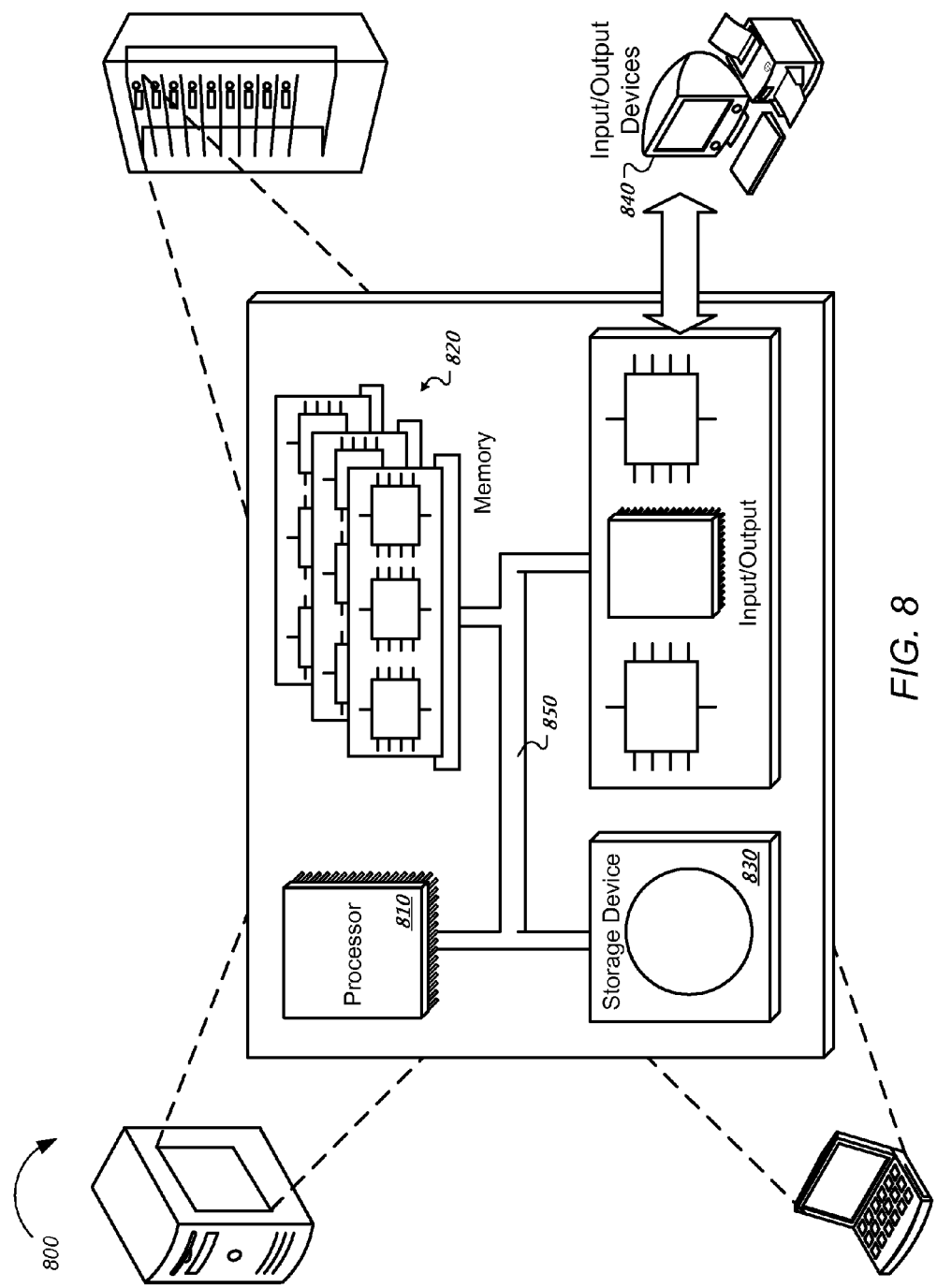
FIG. 8 shows a schematic diagram of an example computer system.

FIG. 8 shows a schematic diagram of an example computer system 800. The system 800 can be used for the operations described in association with the method 200 shown in FIG. 2, according to one implementation, the method 400 shown in FIG. 4, according to one implementation, or the method 600 shown in FIG. 6, according to another implementation.

The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840. In some embodiments, a parallel processing set of systems 800 connected over a network may be employed, clustered into one or more server centers.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, or some other large capacity storage device.

The input/output device 840 provides input/output operations for the system 800. In one implementation, the input/output device 840 includes a keyboard and/or pointing device. In another implementation, the input/output device 840 includes a display unit for displaying graphical user interfaces.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:

receiving, at a computing system including one or more processors, a plurality of n-grams, each n-gram representing a sequence of one or more consecutive words, and each n-gram being associated with a value for a parameter related to a probability of the n-gram with respect to a corpus;

determining, at the computing system, a fingerprint for each of the plurality of n-grams to obtain a plurality of fingerprints, each fingerprint representing a distinct index for a specific n-gram;

identifying, at the computing system, a location in an array for each of the plurality of n-grams using a perfect hash function to obtain a plurality of locations, wherein the array associates the plurality of fingerprints with the plurality of n-grams, respectively; and encoding, at the computing system, the value of the parameter for each of the plurality of n-grams in the array to obtain a modified array, wherein the value of the parameter for a specific n-gram is encoded at a specific location in the array that is associated with the specific n-gram.

2. The computer-implemented method of claim 1, wherein the perfect hash function is defined as:

$$g(x_i) = f(x_i) \otimes \left( \overset{k}{\underset{i=1}{\otimes}} A[h_i(x_i)] \right),$$

where $g(x_i)$ represents the perfect hash function for an n-gram $x_i$, $f(x_i)$ represents a fingerprint of the n-gram $x_i$, $A[h_i(x_i)]$ represents a value stored in location $h_i(x_i)$ of the array A corresponding to a hash function $h_i$ applied to the n-gram $x_i$ for all k hash functions, and $\otimes$ is a bitwise exclusive OR operator.

3. The computer-implemented method of claim 1, further comprising determining, at the computing system, an order for encoding the values of the parameters for the plurality of n-grams using an update rule, wherein the encoding is performed according to the order.

4. The computer-implemented method of claim 3, wherein the update rule is defined as:

$$A[h_j(x_i)] = v(x_i) \otimes f(x_i) \otimes \left( \overset{k}{\underset{i=1 \cap i \neq j}{\otimes}} A[h_i(x_i)] \right),$$

where $v(x_i)$ represents the value of the parameter for an n-gram $x_i$, $f(x_i)$ is the fingerprint of the n-gram $x_i$, and $$\left( \overset{k}{\underset{i=1 \cap i \neq j}{\otimes}} A[h_i(x_i)] \right)$$

is a bitwise exclusive OR of the values for the parameters stored in the locations in the array A indexed by k−1 hash functions, excluding a hash function $h_j$ for the n-gram $x_i$.

5. The computer-implemented method of claim 1, wherein the parameter includes at least one of (i) a conditional probability indicating a frequency of a specific n-gram in the corpus and (ii) a back-off weight indicating a factor for estimating the conditional probability of the specific n-gram when the specific n-gram is not found in the corpus.

6. The computer-implemented method of claim 1, further comprising:

generating, at the computing system, a language model based on the modified array; and performing, at the computing system, at least one of speech recognition, machine translation, and optical character recognition using the language model.

7. The computer-implemented method of claim 6, wherein when the corpus is larger than a predetermined size indicating an acceptable size for storage by the computing system, the generating of the language model based on the modified array further includes:

dividing, at the computing system, the corpus into a plurality of distinct portions; and generating, at the computing system, a language model for each of the plurality of distinct portions of the corpus to obtain a plurality of language models.

8. The computer-implemented method of claim 7, further comprising determining a number of distinct portions for dividing the corpus and for generating the plurality of language models such that each of the plurality of language models can achieve less than or equal to an acceptable error rate.

9. The computer-implemented method of claim 7, wherein the at least one of speech recognition, machine translation, and optical character recognition is performed by performing parallel processing using the plurality of language models.

10. The computer-implemented method of claim 1, wherein identifying locations in the array further comprises:

building the array having a specified number of locations;

identifying the plurality of locations corresponding to the plurality of n-grams, respectively;

identifying a first n-gram-location pair corresponding to a first n-gram associated with a first location of degree one, where the first location is of degree one when no other n-gram of the plurality of n-grams is associated with the first location; and removing the first n-gram-location pair such that the n-gram no longer corresponds to any other locations in the array such that one or more other locations in the array are of degree one.

11. A computing system comprising:

an input/output device configured to receive a plurality of n-grams, each n-gram representing a sequence of one or more consecutive words, and each n-gram being associated with a value for a parameter related to a probability of the n-gram with respect to a corpus; and one or more processors configured to:

determine a fingerprint for each of the plurality of n-grams to obtain a plurality of fingerprints, each fingerprint representing a distinct index for a specific n-gram, identify a location in an array for each of the plurality of n-grams using a perfect hash function to obtain a plurality of locations, wherein the array associates the plurality of fingerprints with the plurality of n-grams, respectively, and encode the value of the parameter for each of the plurality of n-grams in the array to obtain a modified array, wherein the value of the parameter for a specific n-gram is encoded at a specific location in the array that is associated with the specific n-gram.

12. The computing system of claim 11, wherein the perfect hash function is defined as:

$$g(x_i) = f(x_i) \otimes \left( \bigotimes_{i=1}^{k} A[h_i(x_i)] \right),$$

where $g(x_i)$ represents the perfect hash function for an n-gram $x_i$, $f(x_i)$ represents a fingerprint of the n-gram $x_i$, $A[h_i(x_i)]$ represents a value stored in location $h_i(x_i)$ of the array A corresponding to a hash function $h_i$ applied to the n-gram $x_i$ for all k hash functions, and $\otimes$ is a bitwise exclusive OR operator.

13. The computing system of claim 11, wherein the one or more processors are further configured to determine an order for encoding the values of the parameters for the plurality of n-grams using an update rule, wherein the encoding is performed according to the order.

14. The computing system of claim 13, wherein the update rule is defined as:

$$A[h_j(x_i)] = v(x_i) \otimes f(x_i) \otimes \left( \bigotimes_{i=1 \cap i \neq j}^{k} A[h_i(x_i)] \right),$$

where $v(x_i)$ represents the value of the parameter for an n-gram $x_i$, $f(x_i)$ is the fingerprint of the n-gram $x_i$, and $$\left( \bigotimes_{i=1 \cap i \neq j}^{k} A[h_i(x_i)] \right)$$

is a bitwise exclusive OR of the values for the parameters stored in the locations in the array A indexed by k−1 hash functions, excluding a hash function $h_j$ for the n-gram $x_i$.

15. The computing system of claim 11, wherein the parameter includes at least one of (i) a conditional probability indicating a frequency of a specific n-gram in the corpus and (ii) a back-off weight indicating a factor for estimating the conditional probability of the specific n-gram when the specific n-gram is not found in the corpus.

16. The computing system of claim 11, wherein the one or more processors are further configured to:
generate a language model based on the modified array; and
perform at least one of speech recognition, machine translation, and optical character recognition using the language model.

17. The computing system of claim 16, wherein when the corpus is larger than a predetermined size indicating an acceptable size for storage by a storage device of the computing system, the one or more processors are further configured to generate the language model based on the modified array by:
dividing the corpus into a plurality of distinct portions; and
generating a language model for each of the plurality of distinct portions of the corpus to obtain a plurality of language models.

18. The computing system of claim 17, wherein the one or more processors are further configured to determine a number of distinct portions for dividing the corpus and for generating the plurality of language models such that each of the plurality of language models can achieve less than or equal to an acceptable error rate.

19. The computing system of claim 17, wherein the at least one of speech recognition, machine translation, and optical character recognition is performed by the one or more processors by performing parallel processing using the plurality of language models.

20. The computing system of claim 11, wherein the one or more processors are further configured to identify locations in the array by:
building the array having a specified number of locations;
identifying the plurality of locations corresponding to the plurality of n-grams, respectively;
identifying a first n-gram-location pair corresponding to a first n-gram associated with a first location of degree one, where the first location is of degree one when no other n-gram of the plurality of n-grams is associated with the first location; and
removing the first n-gram-location pair such that the n-gram no longer corresponds to any other locations in the array such that one or more other locations in the array are of degree one.

21. A computer-implemented method comprising:
receiving, at a computing system including one or more processors, a plurality of n-grams, each n-gram representing a sequence of one or more consecutive words, and each n-gram being associated with a value for a parameter related to a probability of the n-gram with respect to a corpus;
determining, at the computing system, a fingerprint for each of the plurality of n-grams to obtain a plurality of fingerprints, each fingerprint representing a distinct index for a specific n-gram;
generating, at the computing system, an array configured to (i) store a specific value of the parameter for each of the plurality of n-grams and (ii) associate the plurality of fingerprints with the plurality of n-grams, respectively;
identifying, at the computing system, a location in the array for each of the plurality of n-grams using a perfect hash function to obtain a plurality of locations; and
encoding, at the computing system, the values of the parameter for the plurality of n-grams in the array at the plurality of locations, respectively, to obtain a modified array.

22. The computer-implemented method of claim 21, wherein the perfect hash function is defined as:

$$g(x_i) = f(x_i) \otimes \left( \bigotimes_{i=1}^{k} A[h_i(x_i)] \right),$$

where $g(x_i)$ represents the perfect hash function for an n-gram $x_i$, $f(x_i)$ represents a fingerprint of the n-gram $x_i$, $A[h_i(x_i)]$ represents a value stored in location $h_i(x_i)$ of the array A corresponding to a hash function $h_i$ applied to the n-gram $x_i$ for all k hash functions, and $\otimes$ is a bitwise exclusive OR operator.

23. The computer-implemented method of claim 22, wherein k equals three.

24. The computer-implemented method of claim 21, further comprising generating, at the computing system, a language model based on the modified array.

25. The computer-implemented method of claim 24, further comprising:
receiving, at the computing system, input from a user;
performing, at the computing system, at least one of speech recognition, machine translation, and optical character recognition based on the input from the user and using the language model to obtain an output; and
providing, from the computing system, the output to the user.

* * * * *

UNITED STATES PATENT AND TRADEMARK OFFICE
CERTIFICATE OF CORRECTION

PATENT NO. : 8,359,201 B1
APPLICATION NO. : 13/488914
DATED : January 22, 2013
INVENTOR(S) : David Talbot et al.

Page 1 of 1

It is certified that error appears in the above-identified patent and that said Letters Patent is hereby corrected as shown below:

On the Title Page, item (73) Assignee should read:    Google Inc., Mountain View, CA (US)

Signed and Sealed this
Twenty-eighth Day of May, 2013

Teresa Stanek Rea
*Acting Director of the United States Patent and Trademark Office*